United States Patent [19]

Kasai

[11] Patent Number: 4,664,574
[45] Date of Patent: May 12, 1987

[54] EYELET ASSEMBLY

[75] Inventor: Kazumi Kasai, Toyama, Japan

[73] Assignee: Nippon Notion Kogyo Co., Ltd., Tokyo, Japan

[21] Appl. No.: 784,455

[22] Filed: Oct. 3, 1985

[30] Foreign Application Priority Data

Oct. 26, 1984 [JP] Japan .................. 59-161894[U]

[51] Int. Cl.$^4$ ............................................. F16B 35/04
[52] U.S. Cl. ................................. 411/508; 411/510
[58] Field of Search .............. 24/141, 142, 618, 620, 24/682, 690, 691; 411/508-510, 521, 520

[56] References Cited

U.S. PATENT DOCUMENTS

| 382,921 | 5/1888 | Wilcox | 24/141 |
| 3,049,777 | 8/1962 | Lewin | 24/620 |
| 3,810,279 | 5/1974 | Swick | 411/508 |

FOREIGN PATENT DOCUMENTS

| 748948 | 5/1956 | United Kingdom | 411/521 |
| 925006 | 5/1963 | United Kingdom | . |
| 1128227 | 9/1968 | United Kingdom | . |
| 1185275 | 3/1970 | United Kingdom | 411/510 |

Primary Examiner—William F. Pate, III
Assistant Examiner—Creighton Smith
Attorney, Agent, or Firm—Hill, Van Santen, Steadman & Simpson

[57] ABSTRACT

An eyelet assembly comprising a plastic eyelet body including a hollow cylindrical portion and a flange formed on the upper end of the cylindrical portion and a plastic seat plate including a center hole in which the cylindrical portion of the eyelet body is fitted is disclosed. The eyelet body includes a plurality of vertically spaced arcuate projections of a predetermined thickness formed on the external peripheral surface of the cylindrical portion. The seat plate includes an engaging portion formed along the inner peripheral edge of the center hole for engaging the projections of the eyelet body. Each of the arcuate projections extends by an angular distance which is less than a quarter of the circumference of the cylindrical portion and the arcuate projections at vertically adjacent levels are staggered horizontally so that they do not vertically overlap each other when viewed from the front side of the eyelet body.

5 Claims, 10 Drawing Figures

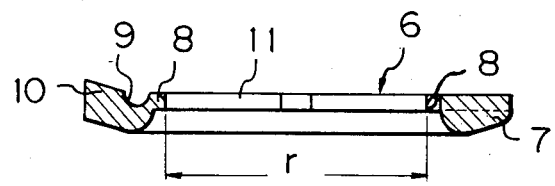
Fig. 4
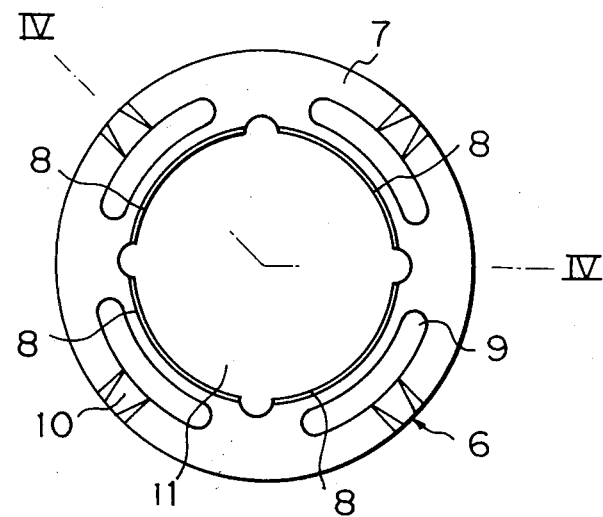
Fig. 5
Fig. 6
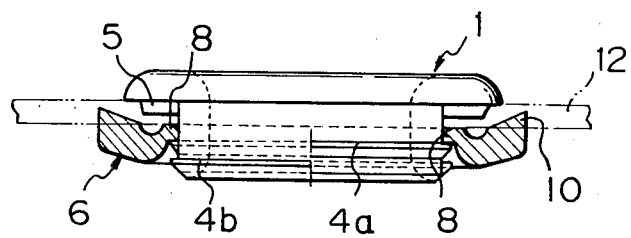

EYELET ASSEMBLY

BACKGROUND OF THE INVENTION

1. Field of the Invention

This invention relates to an eyelet assembly including an eyelet body and a seat plate formed by plastic material which are adapted to be assembled together on a piece of fabric or the like.

2. Prior Art

Heretofore, various types of plastic eyelet assemblies in which the eyelet body and the seat plate are assembled together by utilizing the inherent resilience of plastic material have been known. For instance, a typical example of such a prior art plastic eyelet assembly is disclosed in Japanese Utility Model Application Laid-Open No. 83904/79. As shown in FIG. 8, the eyelet assembly of this prior art includes the plastic seat plate A and plastic eyelet body B which is adapted to be fit in the seat plate A. The external peripheral surface of the cylindrical portion of the eyelet body B is provided with a plurality of annular horizontal projections C having a saw-tooth cross section in vertically spaced relationship. These projections are adapted to engage the engaging portion D formed at the inner edge of the annular seat plate A with fabric pinched between the flange of the eyelet body B and the seat plate A. The position at which the projections C engage with the engaging portion D may be changed depending on variations in the thickness of the fabric.

In this prior art eyelet assembly referred to hereinabove, however, since the projections on the external peripheral surface of the cylindrical portion of the eyelet body are formed with a fully annular shape vertically spaced from each other, when the pitch of the projections is made fine, the thickness of the projections and also the engaging portion of the seat plate must accordingly be made thin. This reduces the strength of the projections and the engaging portion and leads to easy breakage of the same. In particular, when an eyelet assembly is adapted to be used for thin fabric, it is not possible to design the eyelet assembly in such a way that the engaging position between the projections and the engaging portion can be changed depending on variations in the thickness of the fabric, because the thickness of the projections and the engaging portion must be made extraordinarily thin. Thus, the prior art eyelet assembly cannot fully exert its original performance in a thin fabric.

SUMMARY OF THE INVENTION

Therefore, a primary object of the present invention is to provide an eyelet assembly which is applicable to a thin fabric by improving the shape and position of the projections on the external peripheral surface of the cylindrical portion of the eyelet body.

In order to achieve the aforementioned object, the present invention is constructed as an eyelet assembly wherein a plurality of arcuate projections of a predetermined thickness are formed on the external peripheral surface of the cylindrical portion of the eyelet body vertically spaced from each other, each arcuate projection extending by an angular distance which is less than a quarter of the circumference of the cylindrical portion and the projections in vertically adjacent levels are staggered horizontally so that they do not overlap each other vertically when viewed from the front side of the eyelet body.

According to the present invention, since the projections in the veritcally adjacent levels on the eyelet body are staggered horizontally so that they do not overlap vertically, the projections on the eyelet body as well as the engaging portions of the seat plate can be formed relatively thick and thus, even if the pitch of the projections on the eyelet body is made fine, the strength of the projections and the engaging portions will not be reduced. Thus, even when an eyelet assembly is constructed to be used for thin fabric, the eyelet body can be provided with fine pitched projections in such a way that the engaging position between the projection of the eyelet body and the engaging portion of the seat plate can be changed depending upon the thickness of the fabric to which the eyelet assembly is attached.

Many other advantages and features of the present invention will become apparent to those skilled in the art upon making reference to the detailed description and the accompanying drawings in which a preferred embodiment incorporating the principles of the present invention is shown by way of illustrative example.

BRIEF DESCRIPTION OF THE DRAWINGS

FIG. 4 is an elevational view in vertical section of the seat plate to be assembled with the eyelet body taken along the line IV—IV of FIG. 5;

FIG. 5 is a bottom plan view of the seat plate of FIG. 4;

FIG. 6 is an elevational view showing the eyelet assembly when being attached to a piece of fabric;

PREFERRED EMBODIMENTS OF THE INVENTION

Figure 1:
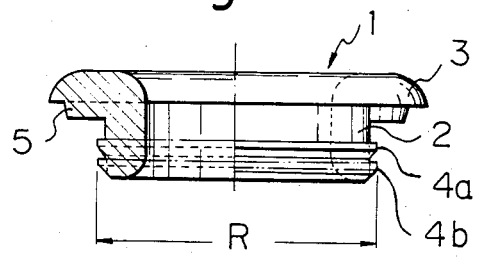
Fig. 1 is an elevational of a first embodiment of the eyelet body according to the present invention with the left half in section.
Figure 2:
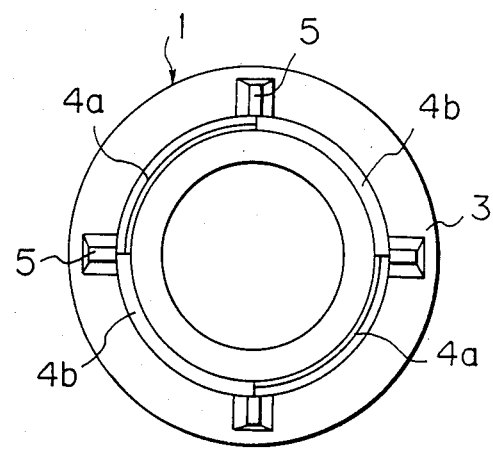
FIG. 2 is a bottom plan view of said eyelet body.

Referring to the accompanying drawings and more particularly to FIGS. 1 and 2 thereof in which the first embodiment of the eyelet assembly according to the present invention is shown, the eyelet body 1 is formed of soft plastic such as Nylon 6 and comprises a hollow cylindrical portion 2 and a flange 3 extending radially outwardly from the upper end of the cylindrical portion. As more clearly shown in FIG. 2, the undersurface of the flange 3 is formed with four detents 5 in an equally spaced relationship in the circumferential direction of the flange so that when the eyelet body 1 is assembled with a seat plate 6 (which will be described hereinbelow), the detents 5 bite into the fabric to thereby prevent the eyelet body from rotating relative to the fabric. Also as more clearly shown in FIG. 2, a first pair of outwardly extending and diametrically opposing projections 4a, 4a are formed on the external peripheral surface of the cylindrical portion 2 each covering the angular distance of a quarter of the circumference of the cylindrical portion and similarly, a second pair of outwardly extending and diametrically opposing projections 4b, 4b are formed on the external peripheral surface of the cylindrical portion 2 each covering the angular distance of a quarter of the circumference of the cylindrical portion.

These first and second pairs of projections 4a, 4a and 4b, 4b are positioned at vertically different levels and are horizontally staggered so that they do not overlap each other veritcally when viewed from the front side of the eyelet body 1. The arrangement of these projections 4a, 4a, 4b, 4b is one of the features of the present invention. As shown in FIG. 1, the first and second pairs of projections 4a, 4a and 4b, 4b have a uniform thickness and a trapezoidal sectional configuration including a flat top surface and a sloped lower surface.

The seat plate 6 is formed of hard plastic such as polybutylene terephtalate (PBT) and as more clearly shown in FIGS. 4 and 5, the seat plate 6 is formed with a center hole 11 in which the cylindrical portion 2 of the eyelet body 1 is fitted. As more clearly shown in FIG. 5, the inner peripheral edge of the hole 11 is formed with four equally spaced engaging portions 8 separated by recesses therebetween and having a uniform thickness and the outer peripheral portion 7 of the seat plate 6 is formed with four arcuate grooves 9 corresponding to the engaging portions 8 in position (FIG. 4) to impart resilient flexibility to the engaging portions 8. Provided on the seat plate 6 outside of the grooves 9 are four detents 10 displaced relative to the detents 5 on the eyelet body 1 so that the detents 10 do not lie on the detents 5 when the eyelet body and seat plate are assembled together.

Figure 7:
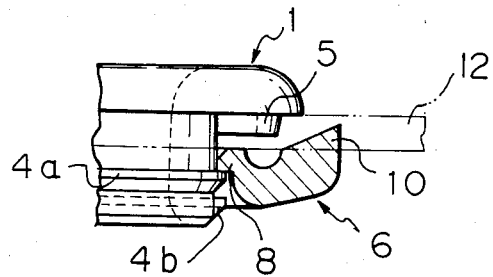
FIG. 7 is a fragmentary elevational view on an enlarged scale showing the engaging portion between the eyelet body and seat plate as shown in FIG. 6.
Figure 8A:
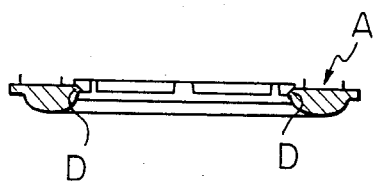
FIG. 8A is an elevational view in vertical section of the seat plate for a prior art eyelet assembly.
Figure 8B:
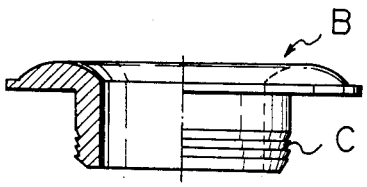
FIG. 8B is an elevational view in left half section of the eyelet body for said prior art eyelet assembly.
Figure 8C:
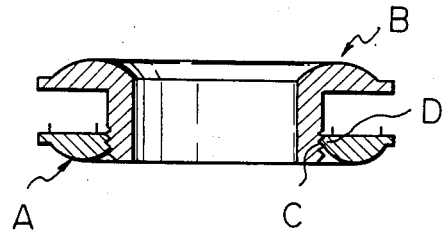
FIG. 8C is an elevational view in section of the assembly of the seat plate and eyelet body as shown in FIGS. 8A and 8B, respectively.

When the eyelet body 1 and seat plate 6 are to be attached to fabric 12, first of all, the fabric 12 is formed with a circular hole (not shown) in a selected position where the eyelet body and seat plate are to be attached. The hole has a diameter slightly smaller than the outer diameter of the cylindrical portion 2 of the eyelet body 1. The seat plate 6 is placed under the circular hole in the fabric 12 and the cylindrical portion 2 of the eyelet body 1 is pressed through the circular hole in the fabric 12 into the hole 11 in the seat plate 6 until the projections of the eyelet body 1 engage the engaging portions 8 on the seat plate 6 to thereby attach the eyelet assembly to the fabric 12 as shown in FIG. 6. FIG. 7 shows the condition of the engaging portion between the projections 4a on the eyelet body 1 and the engaging portions 8 on the seat plate 6 on an enlarged scale. Since the diameter R of the circle described by the outer surfaces of the projections 4a, 4b on the eyelet body 1 (FIG. 1) is slightly greater than the diameter r of the circle described by the inner surface of the engaging portions 8 on the seat plate 6 (FIG. 4), when the cylindrical portion 2 of the eyelet body 1 is pressed into the hole 11 in the seat plate 6, the engaging portions 8 on the seat plate 6 are deformed outwardly. The fabric 12 is pinched between the flange 3 of the eyelet body 1 and the outer peripheral portion of the seat plate 6. The cylindrical portion 2 of the eyelet body 1 is pressed into the hole 11 in the seat plate 6 until the detents 5 on the eyelet body 1 and the detents 10 on the seat plate 6 bite into the fabric 12 in different positions of the fabric 12 whereupon the corresponding projections 4a and engaging portions 8 engage each other and the deformed engaging portions regain their original shape whereby firm assembling of the eyelet body and seat plate is obtained. When the fabric 12 is relatively thick, the lower projections 4b engage the engaging portions 8. As seen on the left-hand side of FIG. 6, since the upper projections 4a do not lie just above the lower projections 4b, even when the engaging portions 8 are formed relatively thick, the engaging portions 8 can engage with the lower projections 4b. Thus, even when the distance or pitch between the upper and lower projections 4a and 4b is made fine, the engaging portions 8 of the seat plate 6 can be made relatively thick. And since the lower projections 4b do not lie just below the upper projections 4a, the upper projections can be made relatively thick. In the conventional eyelet assembly, the thickness of the engaging portions on the seat plate is limited by the narrow space between the upper and lower projections on the eyelet body and since the projections have a saw-tooth cross section, the tips of the engaging portions on the seat plate are necessarily pointed. Therefore, when the pitch of the projections is made fine, the strength of the engaging portions and the projections becomes insufficient and low which makes them fragile and makes it impossible to employ a fine pitch.

As mentioned hereinabove, according to the present invention, since the projections are provided symmetrically on the peripheral surface of the cylindrical portion of the eyelet body so that each projection extends by an angular distance which is less than a quarter of the circumference of the eyelet body, each of the projections are adapted to engage the engaging portions of the seat plate within a predetermined range, the projections in vertically adjacent levels are arranged so that they do not overlap each other vertically and each of the projections are adapted to engage different positions of the seat plate, the projections can engage the engaging portions even when the thickness of the projections and engaging portions is made large.

Figure 3:
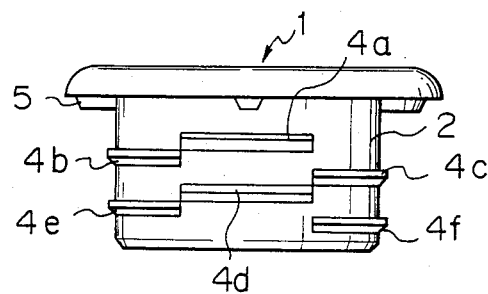
FIG. 3 is an elevational view of a second embodiment of the eyelet body according to the present invention.

Although, in the embodiment shown in FIGS. 1 and 2, each pair of arcuate projections 4a, 4a and 4b, 4b respectively includes two symmetrically disposed projections each extending by an angular distance of a quarter of the circumference of the cylindrical portion 2 of the eyelet body and such pairs of projections are disposed at two different levels so that they do not overlap vertically when viewed from the front side of the eyelet body, the length of the arcuate projections may be shorter than a quarter of the circumference of the cylindrical portion of the eyelet body provided that the projections on the cylindrical portion are provided symmetrically and that the projections at the adjacent levels do not vertically overlap each other. The projections preferably have the same length to ensure a balanced engagement. The number of levels of projections can be varied in proportion to varying thicknesses of fabric as necessary. For example, in order to provide an eyelet assembly which can accommodate six different fabric thicknesses, the eyelet body may be provided, as more clearly shown in FIG. 3, with arcuate projections at six different levels in such an arrangement that each arcuate projection extends by an angular distance of one-sixth of the circumference about the cylindrical portion and the projections in adjacent levels do not overlap each other vertically. In this case, as a seat plate, the seat plate shown in FIGS. 4 and 5 may commonly be used.

What is claimed is:

1. An eyelet assembly comprising a plastic eyelet body (1) including a hollow cylindrical portion (2) and a flange (3) formed on the upper end of said cylindrical portion (2), and a plastic seat plate (6) including a center hole (11) in which said cylindrical portion (2) of said eyelet body (1) is fitted; said eyelet body (1) including a plurality of vertically spaced arcuate projections (4a, 4b, . . .) of predetermined thickness formed on the external peripheral surface of said cylindrical portion (2); said seat plate (6) including a plurality of engaging portions (8) separated by recesses along the inner peripheral edge of said center hole (11) for engaging said projections (4a, 4b . . .) of said eyelet body (1); each of said arcuate projections (4a, 4b, . . .) extending by an angular distance which is less than a quarter of the circumference of said cylindrical portion (2); and said arcuate projections (4a, 5b, . . .) at vertically adjacent levels being staggered horizontally so that they do not vertically overlap each other wherein said seat plate (6) includes a plurality of arcuate grooves (9) disposed along the outside of and in the positions corresponding to said separate engaging portions (8) to thereby impart resilient flexibility to said engaging portions (8).

2. The eyelet assembly of claim 1 wherein each of said arcuate projections extends by an angular distance of one-sixth of said cylindrical portion and said projections are disposed at six different levels.

3. The eyelet assembly of any one of claims 1 or 2, wherein each of said arcuate projections has a trapezoidal sectional configuration and includes a flat top surface and a slanted lower surface.

4. The eyelet assembly of any one of claims 1 or 2, wherein said flange includes a plurality of detents on the undersurface thereof.

5. The eyelet assembly of any one of claim 1, 2 or 4, wherein said seat plate includes a plurality of detents on the uppersurface thereof.

* * * * *